United States Patent
Nishikawa et al.

(10) Patent No.: US 7,495,883 B2
(45) Date of Patent: Feb. 24, 2009

(54) MULTILAYER CERAMIC CAPACITOR AND METHOD FOR MANUFACTURING THE SAME

(75) Inventors: Jun Nishikawa, Gunma (JP); Youichi Mizuno, Gunma (JP); Hirokazu Orimo, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 204 days.

(21) Appl. No.: 11/493,101

(22) Filed: Jul. 25, 2006

(65) Prior Publication Data

US 2007/0025056 A1    Feb. 1, 2007

(30) Foreign Application Priority Data

Jul. 26, 2005    (JP)    ............... 2005-215839

(51) Int. Cl.
   *H01G 4/008*    (2006.01)
   *H01G 4/06*    (2006.01)
(52) U.S. Cl. .................................... 361/305; 361/311
(58) Field of Classification Search ................ 361/305, 361/303–304, 311
   See application file for complete search history.

(56) References Cited

U.S. PATENT DOCUMENTS

| | | | |
|---|---|---|---|
| 5,014,158 A * | 5/1991 | Nishimura et al. | 361/321.4 |
| 5,097,391 A * | 3/1992 | Nomura et al. | 361/321.4 |
| 5,731,950 A * | 3/1998 | Sakamoto et al. | 361/321.4 |
| 6,151,204 A * | 11/2000 | Shigemoto et al. | 361/305 |
| 6,917,513 B1 * | 7/2005 | Kim et al. | 361/321.2 |
| 7,042,706 B2 * | 5/2006 | Nagai et al. | 361/305 |
| 7,295,422 B2 * | 11/2007 | Ito et al. | 361/321.5 |

FOREIGN PATENT DOCUMENTS

| | | |
|---|---|---|
| JP | 04-206613 | 7/1992 |
| JP | 08-273970 | 10/1996 |
| JP | 2000-124058 | 4/2000 |
| JP | 2003-22930 | 1/2003 |

* cited by examiner

*Primary Examiner*—Eric Thomas
(74) *Attorney, Agent, or Firm*—Knobbe Martens Olson & Bear LLP

(57) ABSTRACT

A multilayer ceramic capacitor and a method of manufacturing the same is provided. The capacitor comprises dielectric layers and internal electrode layers alternately stacked. Two of the internal electrode layers that are located outermost and/or at least one of the internal electrode layers that is located inside each outermost internal electrode layer are substantially oxidized and do not function as electrodes. The capacitance of the multilayer ceramic capacitor depends on the unoxidized internal electrode layers other tan the oxidized ones. The method of manufacturing a multilayer ceramic capacitor comprises forming green dielectric layers, forming green internal electrode layers, preparing a green ceramic chip, forming green external electrodes, and firing the green ceramic chip.

7 Claims, 1 Drawing Sheet

MULTILAYER CERAMIC CAPACITOR AND METHOD FOR MANUFACTURING THE SAME

BACKGROUND OF THE INVENTION

1. Field of the Invention

The present invention relates to a multilayer ceramic capacitor including dielectric layers and internal electrode layers alternately stacked and also relates to a method for manufacturing such a multilayer ceramic capacitor.

2. Description of the Related Technology

Japanese Unexamined Patent Application Publication No. 8-124785 discloses a multilayer ceramic capacitor including a ceramic chip and a pair of external electrodes disposed on respective opposed faces of the ceramic chip. The ceramic chip includes dielectric layers and internal electrode layers alternately stacked. One ends of the internal electrode layers are alternately exposed from the opposed faces of the ceramic chip. The external electrodes are electrically connected to the exposed ends of the internal electrode layers.

The multilayer ceramic capacitor is manufactured through forming the green dielectric layers by a coating process and a drying process using a ceramic slurry containing dielectric particles containing $BaTiO_3$ or the like, forming the green internal electrode layers on the respective green dielectric layers by applying a conductive paste containing metal particles containing Ni or another metal onto the green dielectric layers by a printing process, preparing the green ceramic chip by stacking the green dielectric layers having the green internal electrode layers disposed thereon and then pressing the stacked green dielectric layers, forming the green external electrodes by applying the conductive paste onto the green ceramic chip, and firing the green ceramic chip having the green external electrodes disposed thereon. When the internal electrode layers contain a base metal, the fired ceramic chip is further subjected to a heat-treating processreferred to as a reoxidizing process as required such that properties of the ceramic chip are adjusted.

In order to manufacture multilayer ceramic capacitors that need to have high capacitance and a small size, dielectric layers and internal electrode layers with a thickness on the order of micrometer are used for capacitance enhancement and the following components are used for size reduction: 0603-size components (a reference length of 0.6 mm, a reference width of 0.3 mm, and a reference height of 0.3 mm) or 0402-size components (a reference length of 0.4 mm, a reference width of 0.2 mm, and a reference height of 0.2 mm).

The multilayer ceramic capacitors are inferior in flexural strength to large-size multilayer ceramic capacitors including thick layers and large-size components. Therefore, the multilayer ceramic capacitors can be chipped or cracked when the multilayer ceramic capacitors are mounted on substrates or stresses are applied to the mounted multilayer ceramic capacitors.

SUMMARY OF CERTAIN INVENTIVE ASPECTS

Certain inventive aspects have been made in view of the above circumstances. It is an object of certain inventive aspects to provide a multilayer ceramic capacitor and a method for manufacturing the multilayer ceramic capacitor. The multilayer ceramic capacitor has high flexural strength although the multilayer ceramic capacitor includes thin dielectric layers, thin internal electrode layers, and small-size components.

A multilayer ceramic capacitor according to one inventive aspect comprises dielectric layers and internal electrode layers. The dielectric layers and the internal electrode layers are alternately stacked. Two of the internal electrode layers that are located outermost and/or at least one of the internal electrode layers that is located inside each outermost internal electrode layer are substantially oxidized and do not function as electrodes. The capacitance of the multilayer ceramic capacitor depends on the unoxidized internal electrode layers other than the oxidized ones.

Since the outermost internal electrode layers and/or at least one of the internal electrode layers that is located inside each outermost internal electrode layer are substantially oxidized, the oxidized internal electrode layers have flexural strength higher than that of the unoxidized internal electrode layers. This allows the multilayer ceramic capacitor to have high flexural strength.

A method for manufacturing a multilayer ceramic capacitor according to one inventive aspect includes forming green dielectric layers by a coating process and a drying process using a ceramic slurry containing dielectric particles, forming green internal electrode layers on the respective green dielectric layers by applying a conductive paste containing metal particles onto the green dielectric layers by a printing process, preparing a green ceramic chip by stacking the green dielectric layers having the green internal electrode layers and then pressing the stacked green dielectric layers, forming green external electrodes by applying a conductive paste containing metal particles onto the green ceramic chip, and firing the green ceramic chip having the green external electrodes under such conditions that two of the internal electrode layers that are located outermost and/or at least one of the internal electrode layers that is located inside each outermost internal electrode layer are substantially oxidized.

According to the method, this multilayer ceramic capacitor can be manufactured readily and precisely.

Other objects, elements, features, and advantages of certain inventive aspects will become apparent from the following detailed description with reference to the attached drawings.

DESCRIPTION OF CERTAIN ILLUSTRATIVE EMBODIMENTS

First Embodiment

Figure 1:
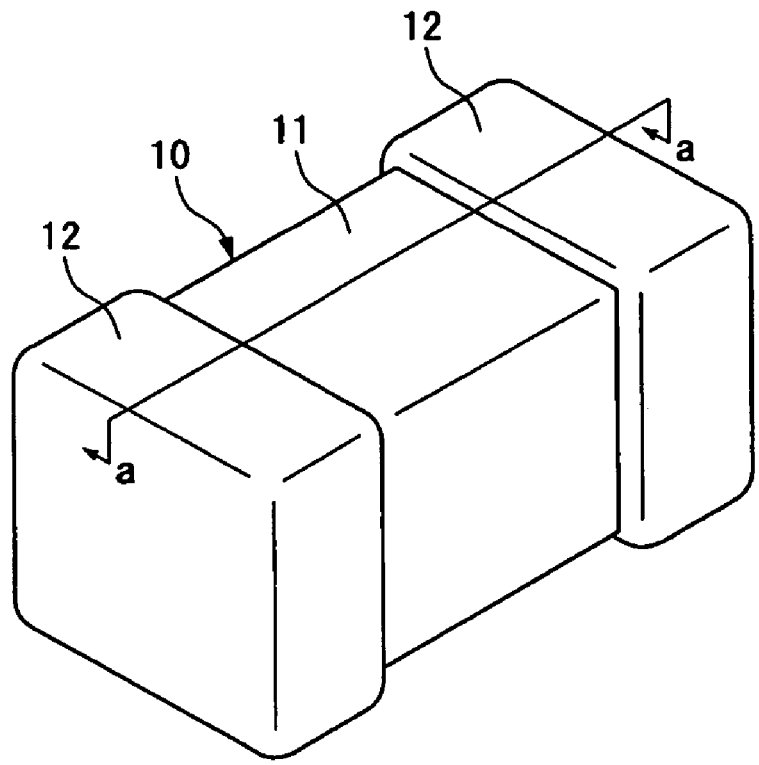
FIG. 1 is a perspective view of a multilayer ceramic capacitor according to a first embodiment.
Figure 2:
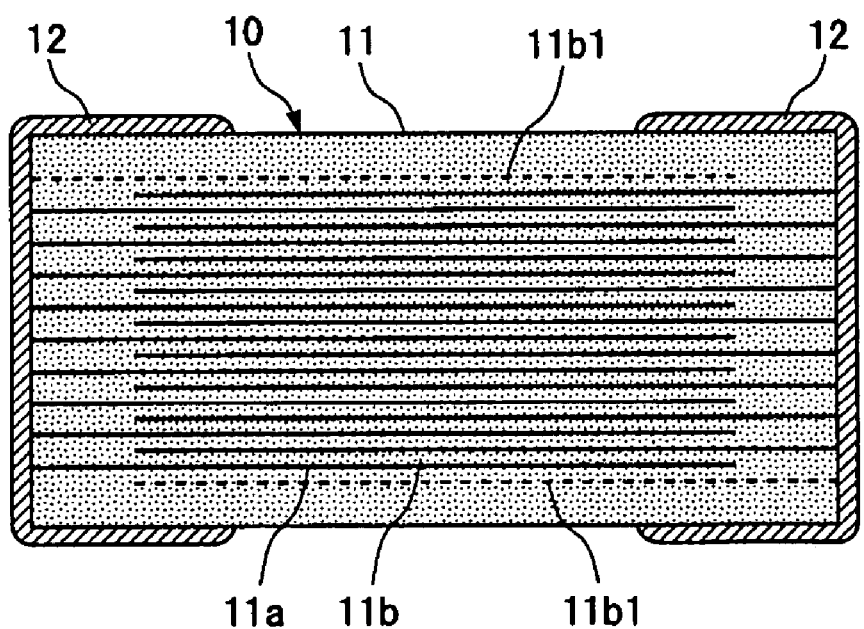
FIG. 2 is a sectional view taken along the line I-I of FIG. 1.

FIG. 1 shows a multilayer ceramic capacitor 10 according to a first embodiment. FIG. 2 is a sectional view taken along the line I-I of FIG. 1.

With reference to FIG. 1, the multilayer ceramic capacitor 10 includes a ceramic chip 11 with a rectangular parallelepiped shape and external electrodes 12 disposed on end portions of the ceramic chip 11 that are spaced from each other in the longitudinal direction of the ceramic chip 11.

The ceramic chip 11 includes dielectric layers 11a made of a dielectric material such as $BaTiO_3$ and internal electrode layers 11b made of a base metal such as Ni, Cu, or Sn. The dielectric layers 11a and the internal electrode layers 11b are alternately stacked. One ends of the internal electrode layers 11b are alternately exposed from opposed end faces of the ceramic chip 11 that are spaced from each other in the longitudinal direction of the ceramic chip 11. The external electrodes 12 each include a plurality of metal layers made of a base metal such as Ni, Cu, or Sn and the innermost metal layers are electrically connected to the exposed ends of the internal electrode layers 11b.

Two of the internal electrode layers 11b that are located outermost are represented by reference numeral 11b1. The two outermost internal electrode layers 11b1 are substantially oxidized and therefore do not function as electrodes. Hence, the capacitance of the Multilayer ceramic capacitor 10 depends on the internal electrode layers 11b other than the oxidized outermost internal electrode layers 11b1.

Second Embodiment

A method for manufacturing a multilayer ceramic capacitor according to a second embodiment will now be described.

A ceramic slurry is prepared by mixing the following components in a ball mill: one part by weight of $BaTiO_3$ powder, ten parts by weight of an organic binder principally containing polyvinyl butyral, and one part by weight of an organic solvent principally containing ethanol.

A conductive paste is prepared by mixing the following components in a ball mill: one part by weight of Ni powder, ten parts by weight of a cellulose binder, and one part by weight of an organic solvent principally containing terpineol.

The ceramic slurry is applied onto a PET film or another film and then dried, whereby green dielectric layers having a predetermined thickness are prepared.

The conductive paste is applied onto the green ceramic sheets by an printing process, whereby green internal electrode layers having a predetermined thickness, shape, and pattern are formed on the green dielectric layers. The green dielectric layers have a size depending on the number thereof and the green internal electrode layers are formed in a matrix depending on the number thereof.

The green dielectric layers having the green internal electrode layers are stacked and then heat-pressed, whereby a stack is prepared. Predetermined portions of the stack are cut, whereby a green ceramic chip with a predetermined size is prepared. One ends of the green internal electrode layers are alternately exposed from opposed end faces of the green ceramic chip that are spaced from each other in the longitudinal direction of the green ceramic chip.

The conductive paste is applied onto the opposed end faces of the green ceramic chip, whereby green external electrodes are formed.

The green ceramic chip having the green external electrodes is fired under such conditions that the two outermost green internal electrode layers are substantially oxidized. In particular, the green ceramic chip is fired at 1,260° C. in an oxidizing atmosphere containing oxygen. The partial pressure of oxygen in the oxidizing atmosphere is higher than the partial pressure of oxygen in an ordinary oxidizing atmosphere. In particular, the partial pressure of oxygen in such an ordinary oxidizing atmosphere is about $10^{-4}$ Pa (about $10^{-9}$ atm). The partial pressure of oxygen in the oxidizing atmosphere is about $10^{-3}$ Pa (about $10^{-8}$ atm) and corresponds to the oxygen partial pressure in equilibrium between nickel and nickel oxide. This allows the green external electrodes and the green ceramic chip including the green internal electrode layers to be simultaneously sintered.

The fired ceramic chip is reoxidized at a temperature of 600° C. to 800° C. in a nitrogen atmosphere such that properties of the ceramic chip are adjusted, whereby a multilayer ceramic capacitor is obtained as shown in FIGS. 1 and 2.

According to this method, the multilayer ceramic capacitor can be manufactured readily and precisely.

Since the green ceramic chip is fired in the oxidizing atmosphere having an oxygen partial pressure higher than that of such an ordinary oxidizing atmosphere, the growth of $BaTiO_3$ grains contained in the green dielectric layers can be prevented; hence, the dielectric strength and temperature coefficients of the multilayer ceramic capacitor can be prevented from being deteriorated due to the growth of the $BaTiO_3$ grains.

In this method, the outermost internal electrode layers are substantially oxidized as described above. The outermost internal electrode layers can be appropriately oxidized in such a manner that firing conditions such as heating rate and cooling rate are adjusted or the fired ceramic chip is reoxidized in air.

In this method, only the outermost internal electrode layers are substantially oxidized. Alternatively, two of the internal electrode layers that are second to the outermost internal electrode layers may be substantially oxidized or two of the internal electrode layers that are second or third to each outermost internal electrode layer may be substantially oxidized. That is, two or more of the internal electrode layers that are located inside each outermost internal electrode layer may be substantially oxidized. This provides the same advantages as described above. In other embodiments, the substantially oxidized internal electrode layers may be one or more internal electrode layers at any location.

EXAMPLE 1

A multilayer ceramic capacitor 10 was manufactured by the method according to the second embodiment and cut into pieces in the stacking direction of internal electrode layers 11b. A cut surface of one of the pieces was polished and then observed with an electron probe microanalyzer (EPMA). The observation showed that the content of oxygen in two outermost internal electrode layers 11b1 was remarkably greater than that of oxygen in internal electrode layers 11b other than the outermost internal electrode layers 11b1. This confirmed that the outermost internal electrode layers 11b1 were substantially oxidized and therefore did not function as electrodes.

The above fact shows that the capacitance of the multilayer ceramic capacitor 10 depends on the internal electrode layers 11b other than the outermost internal electrode layers 11b1.

Since the outermost internal electrode layers 11b1 were substantially oxidized and the internal electrode layers 11b other than the outermost internal electrode layers 11b1 were not oxidized, the outermost internal electrode layers 11b1 had a flexural strength remarkably greater than that of the internal electrode layers 11b.

Since the outermost internal electrode layers 11b1 had such high flexural strength, the multilayer ceramic capacitor 10 also had high flexural strength. This shows that even if the internal electrode layers 11b and dielectric layers 11a included in the multilayer ceramic capacitor 10 have small thicknesses and other components included in the multilayer ceramic capacitor 10 have small sizes, the multilayer ceramic capacitor 10 has high flexural strength and therefore can be prevented from being chipped or cracked when the multilayer ceramic capacitor 10 is mounted on a substrate or a stress is applied to the multilayer ceramic capacitor 10 mounted such a substrate.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A capacitor comprising:
dielectric layers; and
internal electrode layers comprising one or more internal electrode layers that are substantially oxidized and one or more unoxidized internal electrode layers,
wherein the dielectric layers and the internal electrode layers are alternately stacked, wherein the substantially oxidized internal electrode layers do not function as electrodes, wherein the capacitance of the capacitor depends on the unoxidized internal electrode layers.

2. The capacitor of claim 1, wherein two of the internal electrode layers that are located outermost and/or at least one of the internal electrode layers that is located inside each outermost internal electrode layer are substantially oxidized.

3. The capacitor of claim 1, wherein the capacitor comprises a multilayer ceramic capacitor.

4. The capacitor of claim 1, wherein the flexural strength of the substantially oxidized internal electrode layers is substantially higher than that the flexural strength of the unoxidized internal electrode layers.

5. The capacitor of claim 1, wherein the dielectric layers comprise $BaTiO_3$.

6. The capacitor of claim 1, further comprising external electrodes electrically connected to the exposed ends of the internal electrode layers.

7. The capacitor of claim 6, wherein the external electrodes each comprise a plurality of metal layers.

* * * * *